3,681,256
METHOD OF PREPARING POLYMERIZATION CATALYST

Harry W. Blunt, Hickory Hill, Del., assignor to Hercules Incorporated, Wilmington, Del.
No Drawing. Filed Feb. 16, 1971, Ser. No. 115,697
Int. Cl. C08f 1/42
U.S. Cl. 252—429 A  2 Claims

ABSTRACT OF THE DISCLOSURE

Catalyst particles suitable for preparing alpha-olefin polymers in the form of 5 to 15 micron particles are prepared by reducing $TiCl_4$ with an alkylaluminum dihalide at controlled levels of titanium concentration, aluminum concentration, and Al/Ti ratio. The reduction is carried out at room temperature under quiescent conditions.

---

This invention relates to the alpha-olefin polymerization art and in particular, to a method of preparing a small particle catalyst material capable of polymerizing propylene to relatively small polypropylene particles within a narrow size distribution.

Large quantities of stereoregular polypropylene and other alpha-olefin polymers are prepared by a suspension process wherein the olefin is polymerized in an inert liquid diluent in the presence of a trivalent titanium-containing catalyst and an organoaluminum activator. The catalyst is usually prepared by the reduction of titanium tetrachloride, although other tetrahalides can also be used such as, e.g., the tetrabromide, by means of an alkylaluminum halide. The product of this reaction is believed to be a complex titanium-aluminum chloride but, for the sake of brevity, it is usually referred to as a titanium trichloride catalyst or a titanium trichloride-containing catalyst. Titanium trichloride, and thus the catalytically active reduction product as well, exists in two distinct crystal forms, one violet and the other brown. Only the violet form is catalytically active to prepare stereoregular polypropylene. To assure that the catalyst is predominantly violet, it is heat treated to convert the major portion of the brown form to violet.

The polymer particles resulting from the use of catalyst particles prepared by most conventional techniques known to the art range in size from about 20 to 300 microns in diameter. These are usually referred to as flake. There is great need for smaller particles for use in applications such as flatting agents for paints and for laying down thin coatings on, e.g., wood or metal substrates by fusion techniques. To prepare these smaller particles—i.e., about 5 to 10 microns—it has been necessary to reduce flake polymer to the desired size. This is done by mechanical means such as grinding or by emulsification and precipitation of solutions of the polymer. Those methods are unsatisfactory not only because they are expensive, but also because they are unreliable and difficultly reproducible.

Considerable effort has been expended to find methods whereby these polymers can be polymerized directly to the particle size desired. In the course of these investigations it has been determined that with polypropylene and most olefin polymers, there is a correlation between the polymer particle size and shape and that of the titanium trichloride catalyst particle. Thus, a small, spherical catalyst particle produces a small, spherical polymer particle.

In accordance with this invention, it has been determined that small catalyst particles result if particular care is taken in the initial $TiCl_4$ reduction step with regard to reaction temperature and rate, and identity and concentration of the organometallic reducing compound. The invention is the method of preparing a titanium trichloride catalyst useful for polymerizing an alpha-olefin which comprises reducing $TiCl_4$ in an inert hydrocarbon diluent under quiescent conditions at room temperature or less with an alkylaluminum dihalide having 4 to 10 carbon atoms in the alkyl moiety while maintaining, during the aforesaid reduction, an aluminum concentration no more than about 1.8 moles/liter, a Ti concentration no more than about 0.4 mole/liter and an Al/Ti ratio greater than about 4.5.

The titanium trichloride catalyst particles which result from the catalyst preparation method of this invention are spherical in shape when seen under a microscope and are substantially all within the range of 1 to 3 microns. They are non-agglomerated, discrete entities which are readily dispersible in hydrocarbon media to form dispersions which are stable for a sufficient time that they can be easily and accurately metered into a polymerization reaction vessel.

The alkylaluminum compound which is employed in the process of the invention is an alkylaluminum dihalide wherein the alkyl moiety is butyl or larger. Examples of such compounds include butylaluminum dichloride, isobutylaluminum dichloride, isobutylaluminum dibromide, n-pentylaluminum dichloride, hexylaluminum dibromide, n-hexylaluminum dichloride and isohexylaluminum dichloride. The monoalkyl compounds have been taught for use in reducing $TiCl_4$ in the past, but their use has not been preferred inasmuch as they are not highly reactive and the $TiCl_4$ reduction rate is low. The same is true of the higher alkyl compounds which are preferred herein. The slower reaction rate is, of course, not preferred for most commercial processes. To make the small particles sought in the instant invention, however, the low rate of reaction is required. The slow rate at which the reaction takes place appears to contribute to the production of small spherical particles, although the mechanism by which this takes place is not understood.

In assuring that the $TiCl_4$ reduction takes place at the necessary slow rate, the reaction is carried out at room temperature or less. Preferably, it will be done at room temperature—i.e., a maxmium of about 25° C. Only the maximum is important, since lower temperatures will decrease the rate even below that experienced at room temperature. Temperatures of 0° C. and less can be employed, if convenient, although it is not necessary to reduce the rate to this great an extent.

A further contribution to the slow rate of reaction results from carrying out the reaction under quiescent conditions. The reaction mixture is agitated momentarily upon the initial mixing of the ingredients to effect rapid dispersion of the reactants throughout the reaction medium, but is then stopped and the remainder of the reaction is carried out without agitation. Under this quiescent condition, and observing the concentration limits discussed below, the reaction can require as long as 8 to 10 hours to proceed to completion.

Another important parameter which must be controlled in order to prepare catalyst particles of the size sought herein is the concentration of the reactants in the reaction mass. Specifically, the concentration of both the alkylaluminum compound and the titanium tetrachloride, as well as the ratio of aluminum to titanium concentrations must be controlled. More specifically, the aluminum and titanium concentrations must be maintained at a relatively low level, with a substantial preponderance of aluminum over titanium.

With respect to the aluminum compound, the maximum permissible concentration is about 1.8 moles/liter. The lower limit of concentration is, of course, dictated by practical considerations. Practicality would require a minimum of at least about 0.3 mole/liter. Lesser concentrations are not commercially feasible as the amount of catalyst prepared thereby is too little.

Concerning the $TiCl_4$, the maximum concentration is about 0.4 mole/liter. Here again, commercial feasibility fixes the lower limit. The lower limit is about 0.05 mole/liter.

Of equal importance with the concentration of the aluminum and titanium is the ratio of the aluminum to titanium. This ratio must be at least about 4.5/1. The upper limit is fixed by the range within which the individual concentrations of the aluminum and titanium vary. The preponderance of aluminum over titanium, while it obviously will not inhibit the rate of reaction, has been found to inhibit the occurrence of agglomeration of the particles following the reduction of the titanium to the trivalent form and precipitation of the trivalent form. The mechanism of this prevention of agglomeration has not been explained but experimental evidence has established that it is a real occurrence and that the 4.5/1 minimum aluminum to titanium ratio is critical.

The catalyst preparation employing the limiting parameters set forth above is carried out in a hydrocarbon medium. The hydrocarbon is preferably a normally liquid saturated aliphatic hydrocarbon having about 6 to 16 carbon atoms. Since the reaction is carried out at about room temperature or below, any normally liquid hydrocarbon can be employed. This includes the aromatic, aliphatic and aralkyl hydrocarbons. In most cases, the reaction medium is not a single liquid but a mixture of hydrocarbons such as kerosene, gasoline, or other mixtures representing a particular fraction derived from the distillation of petroleum.

In a typical catalyst preparation according to this invention, a solution of the alkylaluminum compound of the prescribed concentration is added in one addition to a solution of $TiCl_4$. This is a departure from the more conventional techniques wherein the reactants are mixed incrementally. One-shot mixing is essential, however, to maintain the required concentrations and Al/Ti ratio in the mass. The reaction mass is agitated during the initial mixing step only sufficiently to accomplish complete mixing of the reactants, i.e., a maximum of two to three minutes. Thereafter, the mass is simply permitted to sit while the reaction proceeds very slowly. When the reaction is complete, as evidenced by a clear, colorless supernatant liquid phase over the precipitate, the solid catalyst precipitate is removed by centrifuging and washed thoroughly with fresh hydrocarbon diluent. In some cases, the catalyst at this point is heat treated prior to use in order to convert any brown catalyst which may be present, to the more active violet form. This heat treatment can be carried out either prior to removal of the catalyst from the liquid used for the reduction step or after it has been filtered out and washed. However, it is an advantage of this invention that, in many cases, the catalyst, as prepared, has a sufficiently high violet content—about 80% or more—that the heat treatment step can be omitted and the catalyst will be highly reactive.

As a result of the controlled $TiCl_4$ reduction, the catalyst particles are formed as discrete, substantially spherical entities about 1 to 3 microns in diameter. These are employed in an otherwise conventional olefin polymerization reaction using an alkylaluminum halide catalyst activator in an inert liquid hydrocarbon diluent.

The catalyst particles of the invention can be employed in the polymerization of any alpha-olefin having 2 to 6 carbon atoms with no branching of the carbon chain closer to the vinyl group than the third carbon atom. Exemplary alpha-olefins are ethylene, propylene, butene-1, 3-methyl butene-1, 3-methyl pentene-1, 4-methyl pentene-1, and hexene-1, as well as mixtures of two or more such monomers wherein one component is in a preponderant concentration, i.e., about 80% or more by weight. Best results with respect to preparing small polymer particles are obtained with propylene and copolymers of propylene with small amounts of a second olefin, particularly ethylene. These are referred to generically as polypropylene.

Other than the use of the specially prepared catalyst according to this invention, the polymerization reaction is carried out the same as any conventional polymerization of the same alpha-olefin. That is to say, it is desirably carried out in an inert liquid diluent at a temperature between room temperature and about 60° C., a pressure less than about 75 p.s.i.g. and with the exclusion of water and air. Polymerization is continued to the desired solid polymer content and the reaction is quenched by adding a small amount of a lower alphatic alcohol to decompose the catalyst. The plymer is then removed from the reaction diluent and washed with several portions of fresh hydrocarbon.

Polypropylene prepared with the catalyst of this invention is in the form of particles of about 5 to 15 microns. Surprisingly, there are very few particles either larger or smaller. Thanks to their small size and also to their relatively narrow size distribution, these particles are very useful as flatting agents in varnishes and lacquers.

Polyethylene can also be prepared in particles of this size using the catalyst prepared by this invention. However, during its formation, polyethylene crystallizes differently and is much more difficult to form into small particles than is polypropylene or the higher alpha-olefins. In order to assure the formation of 5 to 13 micron polyethylene particles, it is preferred to carry out the polymerization of ethylene in the presence of a hydrogen concentration of about 0.1 to 90 mole percent, based on ethylene.

The preparation and use of the unique catalysts according to this invention are illustrated in the following examples. Parts and percentages are by weight unless otherwise indicated. In these examples, the criterion for judging the catalyst size was a filtration test employing a sintered glass filter having a pore size such as to pass any particles less than about 3 microns in diameter. A 10 ml. aliquot of the catalyst was passed through the filter and the weight of the retained particles was determined. Another 10 ml. aliquot was centrifuged and dried. The ratio of these weights of solid particles in the filtered and unfiltered aliquots represents the percentage of oversized particles in the specimen.

EXAMPLE 1

To a clean, nitrogen blanketed reaction vessel was added, at 23° C., 50 parts of a 0.15 molar $TiCl_4$ solution and 50 parts of a 2.83 molar solution of isobutylaluminum dichloride to form a solution which was 0.075 molar in Ti, 1.41 molar in Al and had an Al/Ti ratio of 18.8. The mixture was stirred for about two minutes, then agitation was stopped and the mixture was allowed to sit for sixteen hours at room temperature. The filtration test described above indicated that there was substantially no oversize material in the product.

EXAMPLE 2

The procedure of Example 1 was repeated with a solution wherein the titanium concentration was 0.15 molar and the Al/Ti ratio, accordingly, was 9.1/1. Simultaneously, a control experiment was carried out in which the reacting mass was agitated during the overnight reaction period. When the control sample was filtered, substantially all of the catalyst remained on the filter. There was no oversize material in the sample prepared without agitation.

EXAMPLES 3 TO 17

A series of catalyst preparations were carried out using the procedure of Example 1 except that the aluminum, and titanium concentrations were varied as well as the Al/Ti ratio. Results of these preparations are recorded in the following table:

| Example No. | Al conc. | Ti conc. | Al/Ti | Percent oversize |
|---|---|---|---|---|
| 3 | 1.41 | 0.3 | 4.7 | 0 |
| 4 | 2.83 | 0.53 | 5.4 | 93 |
| 5 | 1.8 | 0.15 | 12 | 0 |
| 6 | 2.4 | 0.15 | 16 | 32 |
| 7 | 2.8 | 0.15 | 18.7 | 32 |
| 8 | 0.3 | 0.29 | 1.0 | 76 |
| 9 | 0.6 | 0.29 | 2.2 | 15 |
| 10 | 0.9 | 0.29 | 3.0 | 22 |
| 11 | 1.15 | 0.38 | 3.0 | 22 |
| 12 | 1.93 | 0.38 | 5.1 | 23 |
| 13 | 2.70 | 0.38 | 7.1 | 75 |
| 14 | 0.5 | 0.5 | 1 | 22 |
| 15 | 1.6 | 0.32 | 5 | 0 |
| 16 | 1.8 | 0.36 | 5 | 0 |
| 17 | 2.2 | 0.18 | 12 | 23 |

Only those examples (3, 5, 15 and 16) wherein all three limiting parameters were within their specified ranges produced a catalyst having no agglomerated or oversize particles.

EXAMPLE 18

The catalyst from Example 2 was employed in a typical polymerization procedure.

About 300 ml. of a hydrocarbon fraction boiling at about 120° C. and containing principally branched chain aliphatics was charged to a nitrogen sparged reaction vessel and 1.5 mmoles of diethylaluminum chloride and an amount of the catalyst equivalent to 0.5 mmole of trivalent titanium were added to the hydrocarbon. The vessel and its contents were heated to 60° C. and sparged with propylene for about 22 minutes, at which time the vent was closed and propylene pressure built up to 30 p.s.i.g. over a period of 18 minutes. Reaction was continued for 5 hours and 12 minutes with the pressure maintained at 30 p.s.i.g. by continued addition of propylene. At this time the vessel was vented and the reaction was quenched with isopropanol overnight.

The polymer was filtered out of the reaction mixture, washed with isopropyl alcohol on the filter and air dried. About 21 grams of polymer was recovered consisting of a powdery material having an I.V. of 2.14. The particles were all between about 5 and 15 microns in diameter, measured by light microscopic examination.

EXAMPLE 19

To a clean, dry reaction flask was added 150 ml. of 1.2 M isobutylaluminum dichloride. To this was added, in one addition, 36 mmoles of neat $TiCl_4$. Stirring was stopped within about 2 minutes and the mixture was allowed to stand at room temperature for about 18 hours. The precipitated titanium trichloride-containing catalyst was washed by centrifuging three times with purified heptane. When the slurry was passed through the sintered glass filter as described above, no particles were left on the filter.

A nitrogen blanketed agitated reaction vessel was charged with 300 ml. of purified heptane, heated to 60° C. and pressured to 15 p.s.i.g. with hydrogen. One mmole of diethylaluminum chloride was added, followed by 0.25 mmole of the titanium trichloride catalyst. Ethylene was charged slowly to a total pressure of about 27 p.s.i.g. over 165 minutes. The reaction mixture was quenched with 10 ml. of isopropanol overnight. The polymer slurry was washed with 5% aqueous hydrochloric acid solution and then with distilled water, then filtered through a medium sintered glass filter.

Microscopic examination showed the polyethylene particle size to be about 2 to 5 microns. The polymer intrinsic viscosity was about 0.7.

What I claim and desire to protect by Letters Patent is:

1. A process for preparing a catalyst useful for the polymerization of an alpha-olefin which process comprises reducing $TiCl_4$ with an alkylaluminum dihalide having 4 to 10 carbon atoms in the alkyl moiety, said reduction being carried out under quiescent conditions at a temperature no greater than about 25° C., in an inert hydrocarbon diluent, while maintaining an aluminum concentration less than 1.8 mole/liter, a Ti concentration less than 0.4 mmole/liter and an Al/Ti ratio greater than about 4.5.

2. The process of claim 1 wherein isobutylaluminum dichloride is employed as the alkylaluminum dihalide.

References Cited
UNITED STATES PATENTS

| | | | |
|---|---|---|---|
| 3,281,375 | 10/1966 | Vandenberg | 252—429 A |
| 3,388,076 | 6/1968 | Lamborn | 252—429 A |
| 3,546,133 | 12/1970 | Ziegler et al. | 252—429 A |
| 3,547,829 | 12/1970 | Lamborn | 252—429 A |
| 3,575,948 | 4/1971 | Blunt | 252—429 AX |

PATRICK P. GARVIN, Primary Examiner

U.S. Cl. X.R.

260—88.2 R, 93.7, 94.9 B